(12) United States Patent
Keibach et al.

(10) Patent No.: US 12,103,605 B2
(45) Date of Patent: Oct. 1, 2024

(54) POWER ASSISTANCE DRIVE FOR A STEERING COLUMN, AND STEERING COLUMN FOR A MOTOR VEHICLE

(71) Applicants: thyssenkrupp Presta AG, Eschen (LI); thyssenkrupp AG, Essen (DE)

(72) Inventors: Martin Keibach, Grabs (CH); Andreas Polzer, Lindau (DE)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 650 days.

(21) Appl. No.: 17/299,649

(22) PCT Filed: Dec. 18, 2019

(86) PCT No.: PCT/EP2019/085931
§ 371 (c)(1),
(2) Date: Jun. 3, 2021

(87) PCT Pub. No.: WO2020/127470
PCT Pub. Date: Jun. 25, 2020

(65) Prior Publication Data
US 2021/0380160 A1     Dec. 9, 2021

(30) Foreign Application Priority Data
Dec. 21, 2018 (DE) ..................... 10 2018 222 832.9

(51) Int. Cl.
*B62D 5/04*     (2006.01)

(52) U.S. Cl.
CPC ......... *B62D 5/0424* (2013.01); *B62D 5/0403* (2013.01); *B62D 5/0451* (2013.01)

(58) Field of Classification Search
CPC ............................ B62D 5/0424; B62D 5/0403
See application file for complete search history.

(56) References Cited

U.S. PATENT DOCUMENTS 7,637,348 B2 * 12/2009 Namgung ............ B62D 5/0424
                                                            180/443
2004/0104067 A1    6/2004   Fishbach
(Continued)

FOREIGN PATENT DOCUMENTS

| CN | 101450677 A | 6/2009 |
|---|---|---|
| CN | 102632921 A | 8/2012 |

(Continued)

OTHER PUBLICATIONS

English Translation of International Search Report issued in PCT/EP2019/085931, dated Apr. 1, 2020.

*Primary Examiner* — Kevin Hurley
(74) *Attorney, Agent, or Firm* — thyssenkrupp North America, LLC (57) ABSTRACT

A power assistance drive for a steering column of a motor vehicle may include a belt drive arranged in a housing, with an input pulley that is coupled to the motor shaft of a motor so as to be rotationally drivable about an input axis and which is drivingly connected by means of a drive belt to an output pulley that is mounted in the housing so as to be rotatable about an output axis. To enable a repair-friendly design and easier replacement of the motor, the motor may be releasably attached to the housing and the motor shaft may be connected to the input pulley by means of a releasable coupling.

18 Claims, 6 Drawing Sheets

(56) References Cited

U.S. PATENT DOCUMENTS

| | | |
|---|---|---|
| 2005/0133297 A1 | 6/2005 | Chikaraishi |
| 2008/0035415 A1 * | 2/2008 | Namgung ............ B62D 5/0424 |
| | | 180/444 |
| 2019/0344822 A1 | 11/2019 | Wou |

FOREIGN PATENT DOCUMENTS

| | | |
|---|---|---|
| DE | 10 2008 042 074 A | 3/2010 |
| DE | 10 2010 053 581 A | 6/2012 |
| DE | 10 2011 012 311 A | 8/2012 |
| DE | 10 2013 112 776 A | 5/2015 |
| DE | 10 2016 119 366 A | 4/2018 |
| DE | 10 2019 112 178 A | 11/2019 |
| DE | 10 2019 115 542 A | 12/2019 |
| FR | 2 835 230 A | 8/2003 |
| JP | 2015-174615 A | 10/2015 |
| WO | 2018068932 A | 4/2018 |
| WO | WO-2019220603 A1 * | 11/2019 ............ B62D 5/0424 |

* cited by examiner

POWER ASSISTANCE DRIVE FOR A STEERING COLUMN, AND STEERING COLUMN FOR A MOTOR VEHICLE

CROSS REFERENCE TO RELATED APPLICATIONS

This application is a U.S. National Stage Entry of International Patent Application Serial Number PCT/EP2019/085931, filed Dec. 18, 2019, which claims priority to German Patent Application No. DE 10 2018 222 832.9, filed Dec. 21, 2018, the entire contents of both of which are incorporated herein by reference.

FIELD

The present disclosure generally relates to steering columns and power assistance drives for steering columns of motor vehicles.

BACKGROUND

In the prior art, motor vehicle steering systems with power assistance are known in which, in addition to the steering moment exerted manually by the driver on the steering wheel, an auxiliary force and in some cases an additional steering angle is/are introduced into the steering train in order to support and assist the driver by means of an electromechanical power assistance.

The auxiliary force is generated by means of a power assistance drive. The power assistance drive has an electric motor, the motor shaft of which is coupled to the steering train via a power assistance gear mechanism. In the generic design of the power assistance drive, described for example in the prior art in DE 10 2011 012 311 A1, the power assistance gear mechanism comprises a belt drive, preferably a toothed belt drive. This comprises a toothed belt pulley coupled to the motor shaft as an input pulley, an output pulley which is also configured as a toothed belt pulley, and a drive belt formed as a circulating toothed belt. The input pulley can be driven by the motor in rotation about the input axis which lies substantially parallel to the output axis of the output pulley. A defined belt tension can be set via the axial spacing between the input and output axes.

In DE 10 2011 012 311 A1, the belt drive of a power assistance drive is integrated in a steering gear mechanism, in which a toothed rack connected to the track rods of the steerable wheels is mounted so as to be longitudinally displaceable. A steering pinion connected to the steering shaft and mounted rotatably in the housing intermeshes with the rack, so that a steering moment introduced into the steering shaft is converted into a linear motion of the rack, causing a steering deflection of the wheels.

The power assistance is introduced into the toothed rack via a spindle drive having a threaded spindle which engages in a spindle nut. The spindle nut is connected to the output pulley of the belt drive, and can be driven thereby so as to be rotatable relative to the threaded spindle about the output axis, which is identical to the spindle axis of the threaded spindle. Because the output pulley is supported in the housing in the direction of the output axis, by rotation of the output pulley, the motor can introduce a power assistance into the toothed rack in the direction of the spindle axis, which corresponds to the longitudinal direction of the rack.

In the power assistance drive known from DE 10 2011 012 311 A1, the input pulley is fixedly connected to the motor shaft. If a fault occurs which requires replacement of the motor, the motor with the input pulley must be removed. For this, necessarily, the input pulley must be removed from the housing and disengaged from the drive belt. The resulting undefined position of the drive belt in the housing hinders installation of a new motor, wherein the input pulley must be brought into engagement with the belt. Also, production and installation tolerances may cause a change in the axial spacing, which changes the belt tension. To guarantee smooth running with low wear, subsequent adjustment of the belt tension is required. As a result, repair by replacement of the motor is time-consuming and complex.

Thus, a need exists to indicate a power assistance drive with a belt drive which is structured in a more repair-friendly fashion and allows simpler exchange of the motor.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a power assistance drive for a steering column of a motor vehicle. In some examples, such a power assistance drive may include a belt drive arranged in a housing, with an input pulley which is coupled to the motor shaft of a motor so as to be rotationally drivable about an input axis and which is drivingly connected by means of a drive belt to an output pulley that is mounted in the housing so as to be rotatable about an output axis.

According to the invention, for a power assistance drive for a steering column of a motor vehicle, comprising a belt drive arranged in a housing, with an input pulley which is coupled to the motor shaft of a motor so as to be rotationally drivable about an input axis and which is drivingly connected by means of a drive belt to an output pulley that is mounted in the housing so as to be rotatable about an output axis, it is proposed that the motor is releasably attached to the housing and the motor shaft is connected to the input pulley by means of a releasable coupling.

The motor is connected to the housing by means of a releasable connection, for example by means of a screw flange or similar. The releasable coupling, which according to the invention is inserted between the input pulley—preferably configured as a belt pulley of a toothed belt drive—and the motor shaft, allows a physical separation of the drive connection. As a result, after release of the connection, the motor can be extracted from the housing and removed, wherein the coupling to the input pulley is separated.

It is an advantage of the invention that the input pulley may remain in the housing even on removal of the motor. The belt drive need not be dismantled by removal of the input pulley, as in the prior art. It is possible that the axial spacing between the input and output pulleys may remain substantially constant, with correspondingly less deterioration in the belt tension. As a result, subsequent adjustment of the belt tension may be simplified or omitted, and the repair cost for replacement of a faulty motor is lower than in the prior art.

It may be provided for the coupling to have coupling elements which are connected to the motor shaft and the input pulley, and to be able to be brought into engagement with one another in the axial direction with respect to the input axis. The coupling elements are designed correspondingly to one another, and may be arranged on the free end of the motor shaft and on the motor side of the input pulley. In the mounted state of the motor, the coupling elements create a torque-transmissive connection directly with one another or via a further interposed coupling element. For removal, the motor may be released and extracted from the housing in the direction of the input axis, wherein the coupling elements are separated and moved apart from one another in the axial direction. For installation, a functioning motor is oriented with its motor shaft coaxial to the input axis, and placed on the housing in the opposite axial direction, wherein the coupling elements are brought into coupling engagement.

The coupling elements may have mutually corresponding form-fit elements such as claws, toothing or similar, which may be brought into coupling engagement in the axial direction.

The input pulley may be arranged on a drive shaft which is rotatably mounted in the housing. The input pulley is preferably aligned to the motor shaft, and on the motor side may have a coupling element which corresponds to a coupling element on the motor shaft.

Alternatively, it is possible for the input pulley to be mounted rotatably on an axle bolt or journal which is held in the housing. A coupling element may then be arranged or formed on the input pulley itself.

It may be provided for the input pulley to be mounted in the housing so as to be movable in the housing transversely to the input axis. In this way, the input pulley can be moved in the housing perpendicularly to the input and output axes, so that the axial spacing between the input and output axes can be varied in order to adjust the belt tension. An adjustable belt tensioning device can be created by the input pulley which can be positioned on the housing.

An advantageous embodiment of the invention provides for the input pulley to be mounted on a bearing carrier which can be positioned relative to the housing. The bearing carrier may preferably have at least one bearing for rotatable mounting of the input pulley or input axis. Because the position of the bearing carrier is predefined transversely to the input axis, the axial spacing can be changed in order to adjust the belt tension. It is possible for the bearing carrier to be able to be fixed in the set position, for example by means of fixing elements such as bolts or similar. A releasable connection here has the advantage that the belt tension can be subsequently adjusted, in that the bearing carrier is detached and repositioned.

It is also possible for the bearing carrier to be mounted movably relative to the housing and to be able to be loaded with a preload acting in the direction of the axial spacing, which acts in the direction of enlarging the axial spacing between the input and output pulleys. The belt tension can be adjusted via the preload force.

The bearing carrier may comprise a bearing cover which can be fixed on the housing, and the input pulley is mounted so as to be rotatable relative thereto. In the bearing cover, a bearing may be arranged in which the drive shaft is mounted unilaterally on the side of the input pulley facing the motor. Advantageously, the bearing cover may be attached to the housing from the outside, preferably by means of releasable fixing elements. For example, the bearing cover may have a flange which can be bolted to the housing from the outside. It is possible for the bearing cover to be able to be fixed to the housing in a variable position, so that the axial spacing can be changed in order to set the belt tension.

On the coupling side facing away from the bearing cover and towards the motor, the motor side of the input pulley is connected to the motor shaft via the coupling. It is possible to provide the motor-side mounting of the input pulley via the mounting of the motor shaft in the motor, whereby no additional motor-side mounting of the input pulley in the housing is necessary.

In an advantageous embodiment, the bearing carrier may have a bearing slide which is displaceably mounted in the housing. The input pulley may be rotatably mounted unilaterally or bilaterally in the bearing slide, for example a drive shaft may be rotatably mounted in the bearing slide. The bearing slide is received in the housing so as to be movable transversely to the input axis, for example along a linear movement track in the direction of the axial spacing.

It is also possible that the bearing slide has an axle bolt on which the input pulley is rotatably mounted.

Because the input pulley is mounted in the housing so as to be tiltable transversely to the input axis, it is possible to compensate for permitted tolerances in the parallel orientation of the input and output pulleys. For this, an angle-compensating mounting in the bearing carrier may be provided, or the bearing carrier is arranged so as to be adjustable in angle relative to the housing.

An advantageous embodiment of the invention provides for a positioning device to be connected to the housing for adjustable positioning and fixing of the motor transversely to the output axis. Via the positioning device, the motor is connected to the housing. Preferably, the motor may be releasably connected to the positioning device, for example via a form-fit receiver, bolt connections or similar. In this way, it is easily possible to remove and install the motor for replacement.

The positioning device may be releasably connected to the housing so that it can easily be installed and removed. It is also possible, by means of correspondingly adapted positioning devices, to use different types of motors during a repair.

The adjustable positioning by means of the positioning device allows the distance between the motor shaft and the output axis to be changed, and thereby the axial spacing between the input pulley—which is coaxially connected to the motor shaft via the coupling according to the invention—and the output pulley to be adjusted in order to set the belt tension. Preferably, the positioning device may comprise adjustment means such as setscrews or similar, which allow a change in spacing between housing and motor. In concrete terms, enlarging the distance between the housing and motor causes the input pulley, which can be positioned relative to the housing, to be moved away from the output pulley and the axial spacing to be enlarged, whereby the belt tension is increased. The positioning device thus forms a preload device for setting the belt tension. Because the positioning device is arranged on the outside of the housing and acts on the motor, exchanging the motor is a simple matter and also any necessary readjustment of the belt tension can easily be carried out from the outside.

The input pulley may be coaxially connected to a spindle nut in which a threaded spindle engages, which is mounted in the housing so as to be longitudinally displaceable in the direction of the output axis. In this way, the power assistance may be introduced into the steering train via a spindle drive. For example, the advantages according to the invention may be achieved with a steering gear of a rack-and-pinion steering mechanism, in that the threaded spindle is connected to a toothed rack, wherein the threaded spindle is formed in a first region, e.g. at an end, of a steering rack, and the toothed rack with its toothing for active engagement with the steering pinion is arranged in a second region spaced from the first region, for example at the other end of the steering rack, wherein a steering pinion, which is mounted rotatably in the housing and is connected to a steering shaft, engages in said rack. The housing here forms the gear housing of the steering gear. It is a particular advantage that a belt drive is accommodated with protection in the housing, wherein thanks to the invention nonetheless a simple exchange of the motor or dismantling of the housing is possible. The steering system is thus particularly maintenance-friendly in comparison with the prior art.

Figure 1:
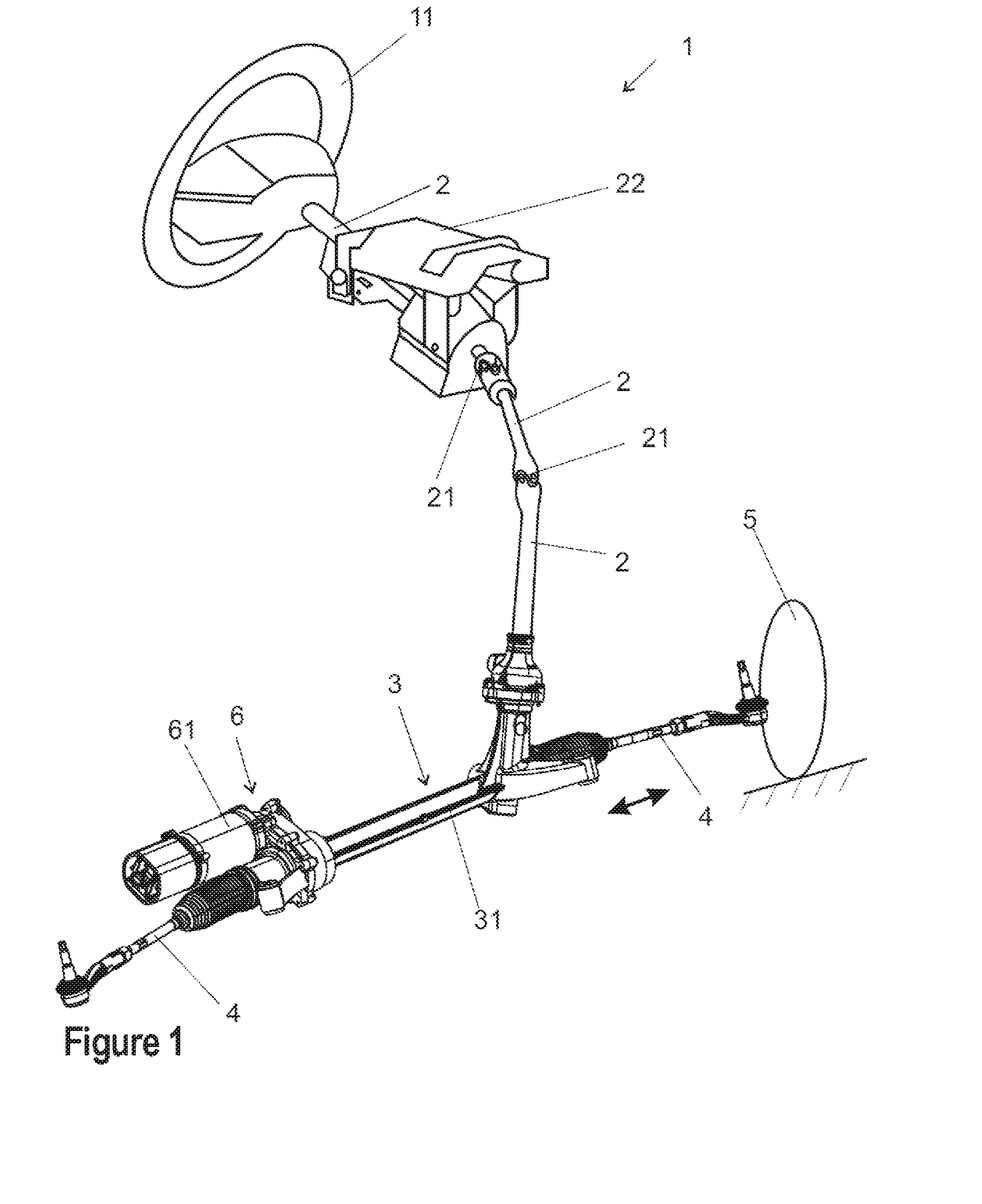
FIG. 1 is a schematic view of a motor vehicle steering system with a power assistance drive.

FIG. 1 schematically shows a motor vehicle steering system 1 with a steering shaft 2 on which a steering wheel 11 is arranged for introduction of a steering torque (steering moment). For adaptation to the structural circumstances in the motor vehicle and to compensate for angular offset, universal joints 21 are inserted in the course of the steering shaft 2.

The motor vehicle steering 1 may be attached to a body of a vehicle (not shown) by means of a carrier unit 22 in which the steering shaft 2 is rotatably mounted.

A steering gear mechanism 3 has a housing 31 in which the steering shaft 2 is rotatably mounted. A steering pinion (pinion), arranged inside the housing 31 at the end of the steering shaft 2, intermeshes with the toothing of the toothed rack which is mounted in the housing 31 so as to be longitudinally displaceable in the direction of the spindle axis S, which is identical to an output axis, as indicated by the double arrow in FIG. 1. At both ends protruding from the housing 31, the toothed rack is connected to respective track rods 4 which in the known fashion are each connected to a steering knuckle of a steered wheel 5.

Figures 2, 3:
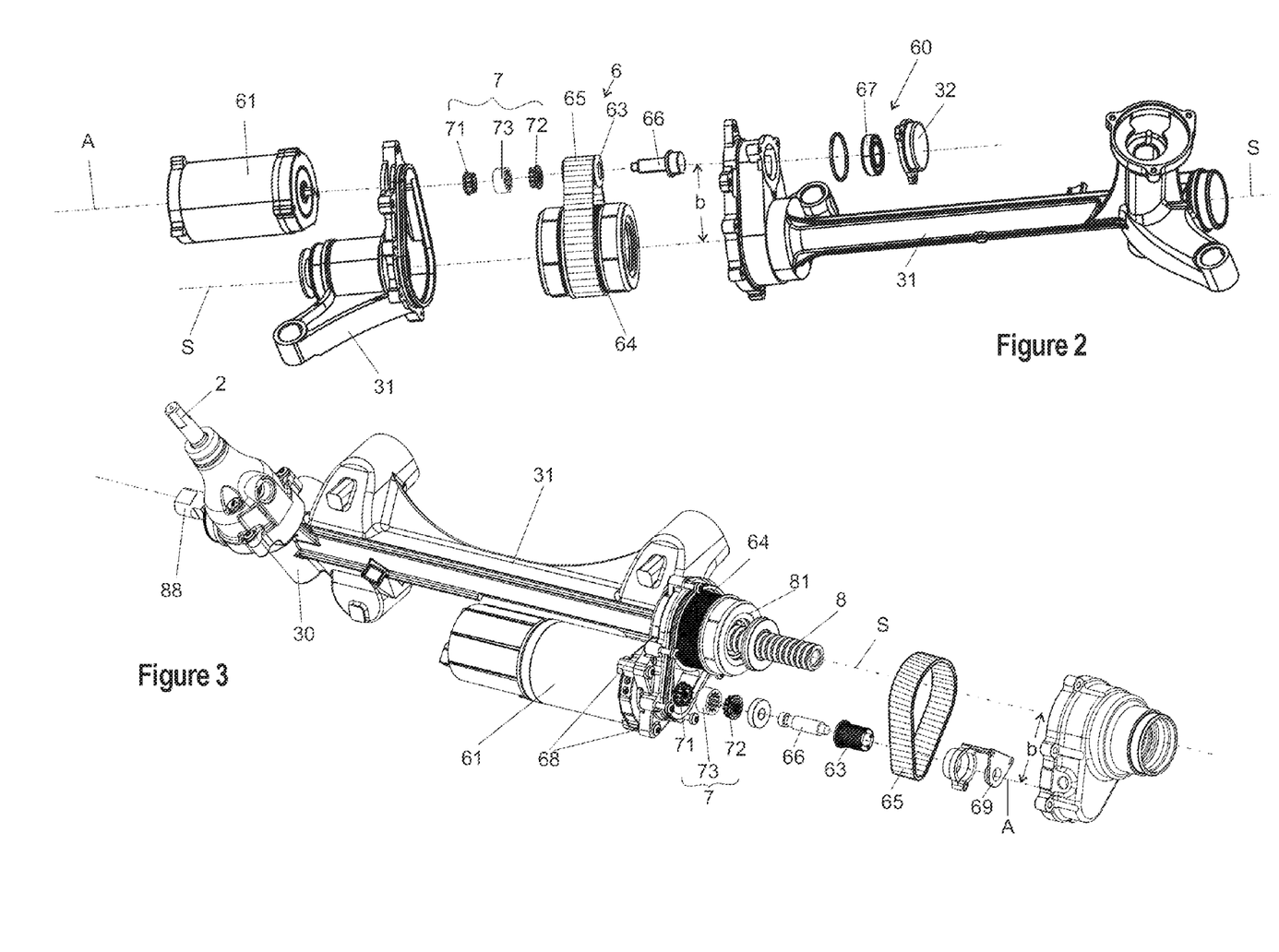
FIG. 2 is a schematic exploded view of a power assistance drive in a first embodiment.
FIG. 3 is a schematic exploded view of a power assistance drive in a second embodiment.
Figure 4:
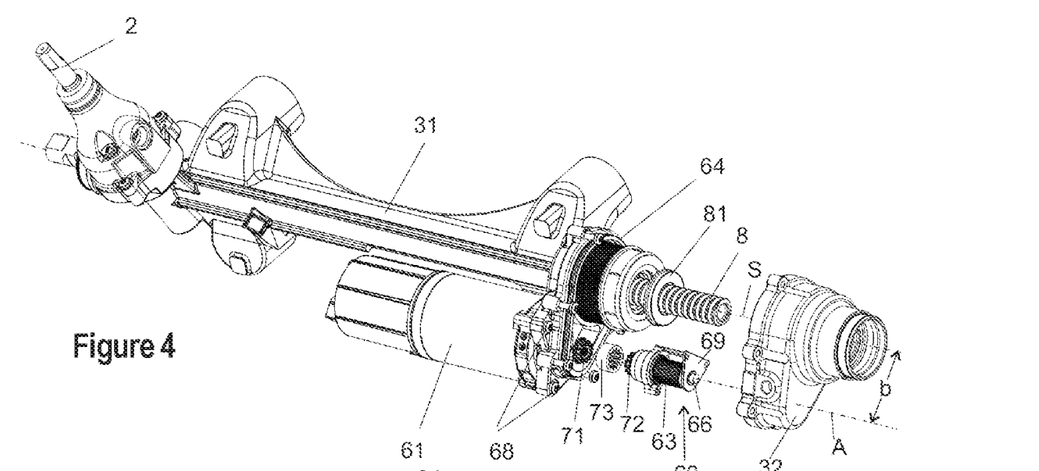
FIG. 4 is another schematic exploded view of the power assistance drive from FIG. 3.
Figures 5, 5A, 5B, 6:
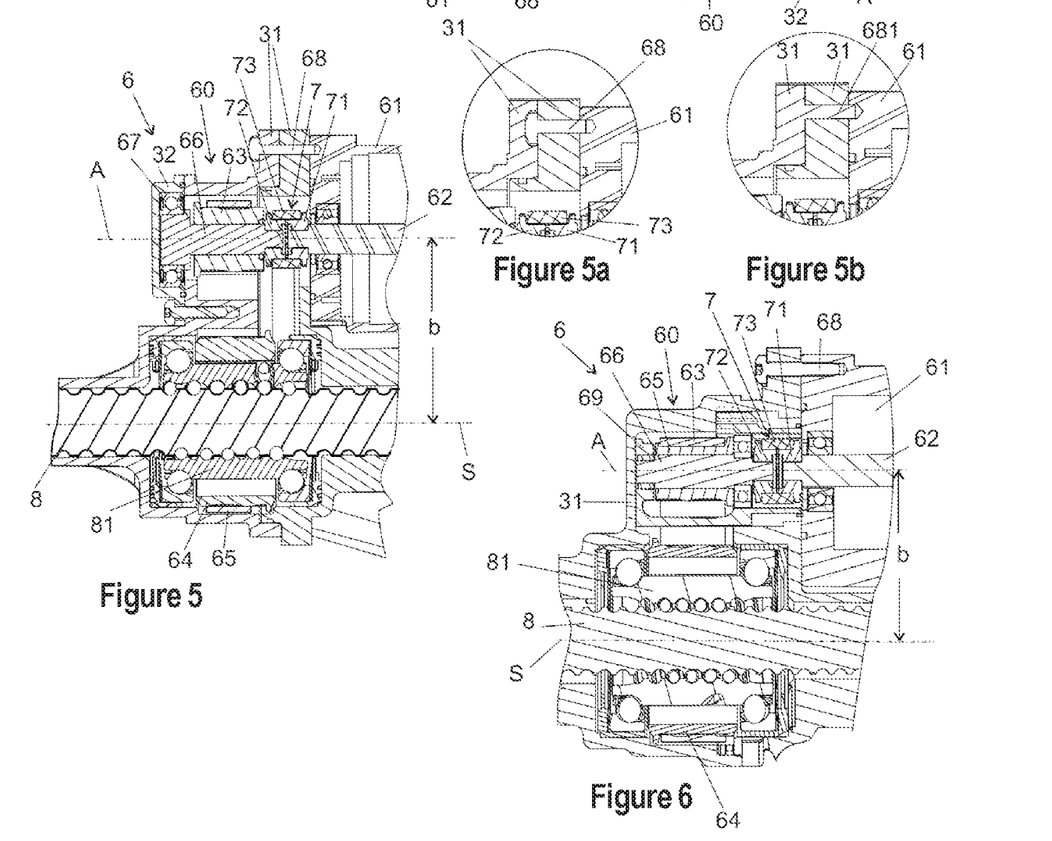
FIG. 5 is a partial sectional view of the power assistance drive from FIG. 2 along input and output axes.
FIG. 5a is a detail view illustrating an example connection between two housing parts of a housing.
FIG. 5b is a detail view illustrating another example connection between two housing parts of a housing.
FIG. 6 is a partial sectional view of the power assistance drive from FIG. 3 along input and output axes.
Figure 7:
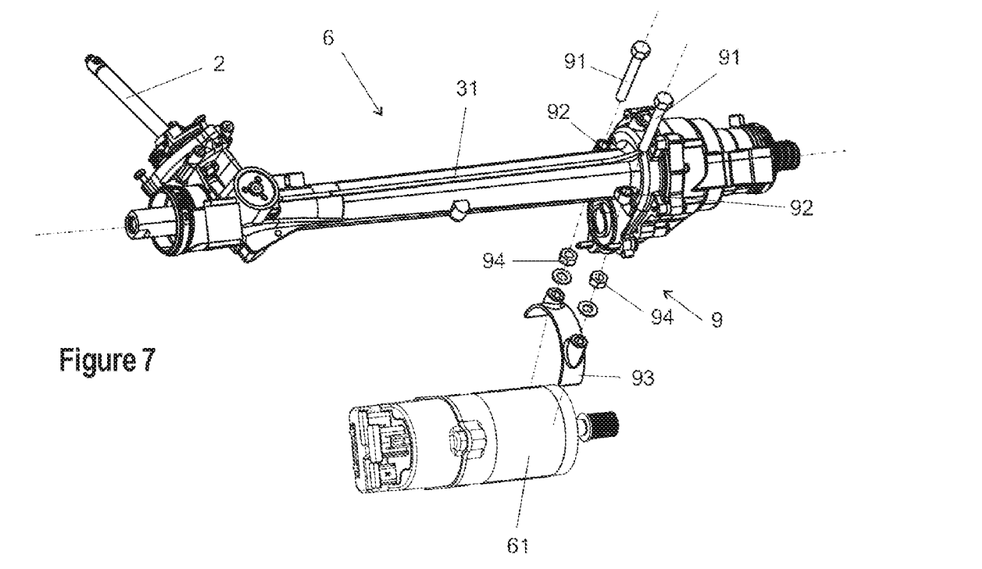
FIG. 7 is a schematic exploded view of a power assistance drive in a third embodiment.
Figure 8:
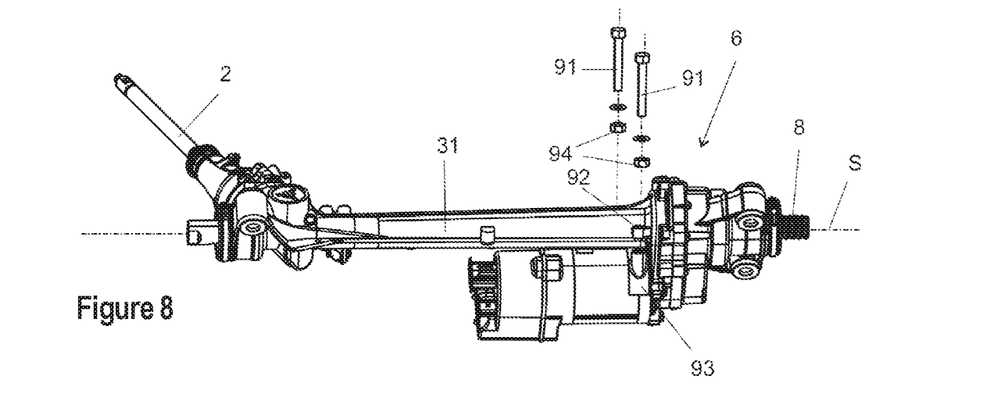
FIG. 8 is a further schematic exploded view of the power assistance drive from FIG. 7, in a partially mounted state.
Figure 9:
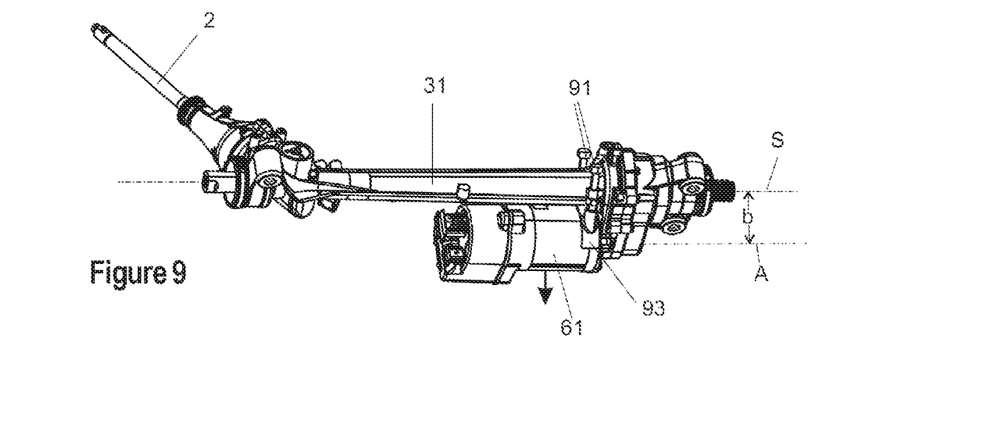
FIG. 9 is a further schematic exploded view of the power assistance drive from FIG. 8, in a mounted state.

To support the steering movement of the toothed rack, caused by manual rotation of the steering shaft 2, a motorized power assistance drive 6 is arranged on the steering gear 3, as shown in different exploded depictions of a first embodiment in FIGS. 2 and 5, and in a second embodiment in FIGS. 3, 4 and 6, wherein the same reference signs are used for identical parts. A third embodiment is shown in FIGS. 7 to 10, and a fourth embodiment in FIGS. 11 and 12.

The power assistance drive 6 has an electric motor 61, preferably a servo motor, with a motor shaft 62.

The housing 31 is divided transversely to the spindle axis S, as evident in FIG. 2. As a power assistance gear, a belt drive, namely a toothed belt drive, is arranged in the housing 31 and comprises an input pulley 63 formed as a toothed belt pulley, an output pulley 64 also formed as a toothed belt pulley, and a circulating drive belt 65 formed as a toothed belt. The output pulley 64 is mounted in the housing 31 so as to be rotatable about the output or spindle axis S. The input pulley 63 is arranged on a drive shaft 66, which is mounted in the housing 31 in a bearing 67, preferably configured as a roller bearing, so as to be rotatable about an input axis A. The bearing 67 is attached to the housing 31 from the outside, and is retained by a bearing cover 32 flanged from the outside onto the housing 31.

The motor 61 is connected to the housing 31 by means of releasable connecting elements 68 which comprise for example bolts or screws, wherein the motor shaft 62 is oriented to the input axis A.

The input axis A and the spindle axis S lie substantially parallel to one another with an axial spacing b.

A releasable coupling 7 is arranged between the motor shaft 62 and the input pulley 63. The coupling 7 has a first coupling element 71 connected fixedly to the motor shaft 62, a second coupling element 72 arranged fixedly on the motor-side end of the drive shaft 66, and a transmission element 73 which, in the mounted operating state of the motor 61, couples the coupling elements 71 and 72 together in a torque-transmissive fashion.

The coupling elements 71 and 72 can be separated from one another axially in the direction of the input axis A. In this way, the motor 61 may be removed from the housing 31, wherein the coupling 7 is physically separated and the drive connection to the input pulley 63 is interrupted.

At its end remote from the motor, the drive shaft 66 is mounted unilaterally in the bearing 67 in the housing 31. On the motor side, it is mounted via the motor shaft 62 in the motor bearings of the motor 61.

The power assistance drive 6 is shown in the mounted state, enlarged, in FIG. 5. It is clearly evident how the drive shaft 66 is connected torque-transmissively to the motor shaft 62 via the coupling elements 71 and 72 and the interposed transmission element 73. It is also clearly evident that, at its end remote from the motor, the drive shaft 66 is mounted so as to be rotatable relative to the housing 31, in the bearing 67 which is received in the bearing cover 32.

FIGS. 5 and 5a show a first variant of how the two housing parts of the housing 31 can be connected to one another and to the motor 61 by means of releasable connecting elements 68. The connecting elements 68 may be configured as screws or bolts, and alternatively or additionally comprise form-fit elements 681 which, as shown as an example in FIG. 5b, may be molded as pins onto one of the halves of the housing 31 so as to position and/or fix the other half and/or the motor 61.

It is clear from FIG. 5 that a threaded spindle 8 extends coaxially to the spindle axis S, is configured as a ball screw spindle and engages in a spindle nut 81 which is coaxially connected to the output pulley 64 and is configured as a corresponding ball nut. The threaded spindle 8 is connected to the toothed rack 88 and together with the spindle nut 81 forms a spindle drive. The spindle nut 81 can be driven rotatably via the belt drive of the motor and is supported axially on the housing 31. Thus by rotation of the spindle nut 81, the threaded spindle 8 can be moved by the motor relative to the housing 31 in the direction of the spindle axis S, in order to support the steering force introduced manually into the steering rack 88 via the steering pinion 30.

FIGS. 3, 4 and 6 show a second embodiment in which the input pulley 63 is mounted in a bearing slide 69. The bearing slide 69 is mounted in the housing 31 so as to be displaceable transversely to the spindle axis S (output axis). Displacement of the bearing slide 69 causes a change in the axial spacing b, so that the belt tension of the drive belt 65 can be adjusted.

FIGS. 7 to 10 show a power assistance drive 6 which may be constructed as explained above with reference to FIGS. 1 to 6. A positioning device 9 is provided which comprises adjustment screws 91 guided through bores 92, formed in the housing 31 transversely to the spindle axis S, wherein they are oriented substantially parallel to the axial spacing b. The adjustment screws 91 rest in the screwing-in direction against a holder 93 which is connected to the motor 61. Between the holder 93 and the housing 31, adjustment nuts 94 are screwed onto the adjustment screws 91 and rest on the housing in the region of the bores 92. By screwing the adjustment nuts 94 onto the adjustment screws 91, the motor 61 can be moved in the direction away from the housing 31, as indicated by the arrow in FIG. 9. As a result, the input pulley 63 connected to the motor shaft 62 via the coupling 7 is moved in the direction away from the output pulley 64. In this way, the axial spacing b may be enlarged in order to increase the belt tension, or accordingly reduced in order to decrease the tension.

Figure 10:
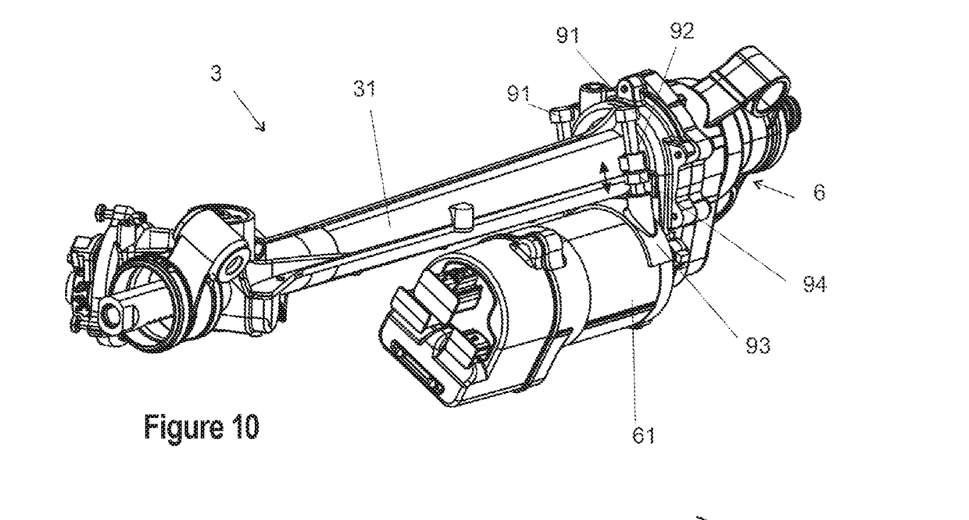
FIG. 10 is a further schematic exploded view of the power assistance drive from FIG. 9, in the mounted state.
Figure 11:
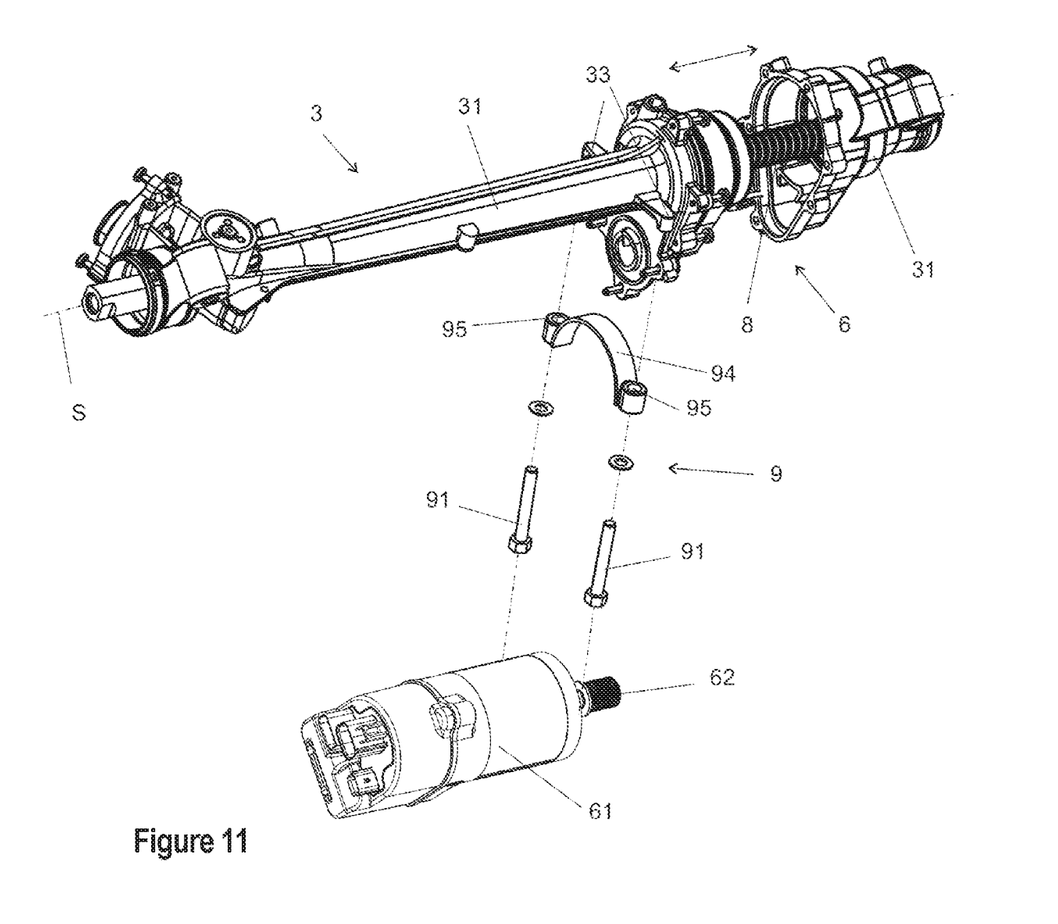
FIG. 11 is a schematic exploded view of a power assistance drive in a fourth embodiment.
Figure 12:
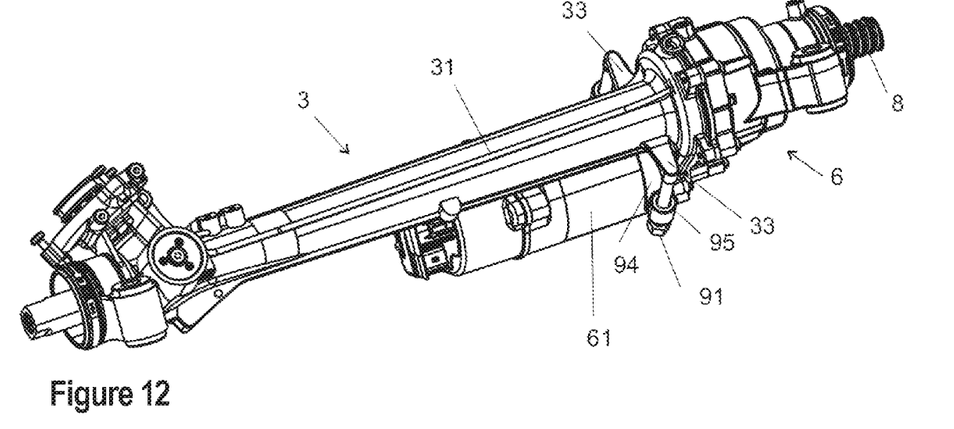
FIG. 12 is a schematic perspective view of a power assistance drive according to FIG. 11 in a mounted state.

FIGS. 10, 11 and 12 show a derived positioning device 9. This has threaded bores 95 in the holder 94, into which the adjustment screws 91 of the motor 61 may be screwed and rest in the screwing-in direction on the housing 31 against protruding supporting brackets 33. By screwing the adjustment screws 91 into the threaded bores 95, the motor 61 may thus be moved in the direction away from the housing 31, whereby the axial spacing b may be changed in order to adjust the belt tension.

LIST OF REFERENCE SIGNS

1 Motor vehicle steering system
11 Steering wheel
2 Steering shaft
21 Universal joint
22 Carrier unit
3 Steering gear mechanism
31 Housing
32 Bearing cover
33 Supporting bracket
4 Track rods
5 Wheel
6 Power assistance drive
61 Motor
62 Motor shaft
63 Input pulley
64 Output pulley
65 Drive belt
66 Drive shaft
67 Bearing
68 Connecting element
681 Form-fit element
69 Bearing slide
7 Coupling
71, 72 Coupling elements
73 Transmission element
8 Spindle
81 Spindle nut
9 Positioning device
91 Adjustment screw
92 Bore
93 Holder
94 Adjustment nut
95 Threaded bore
A Input axis
S Spindle axis (output axis)
b Axial spacing

What is claimed is:

1. A power assistance drive for a steering column of a motor vehicle, the power assistance drive comprising:
a belt drive disposed in a housing, with an input pulley that is coupled to a motor shaft of a motor so as to be rotationally drivable about an input axis,
wherein the input pulley is drivingly connected by a drive belt to an output pulley that is mounted in the housing so as to be rotatable about an output axis,
wherein the motor is releasably attached to the housing and the motor shaft is connected to the input pulley by way of a releasable coupling,
wherein the releasable coupling includes coupling elements that are connected to the motor shaft and the input pulley, and
wherein the coupling elements are engageable with one another in an axial direction with respect to the input axis.

2. The power assistance drive of claim 1 wherein the input pulley is disposed on a drive shaft that is rotatably mounted in the housing.

3. The power assistance drive of claim 1 wherein the input pulley is mounted movably in the housing transversely to the input axis.

4. The power assistance drive of claim 1 wherein the input pulley is mounted on a bearing carrier that is positionable relative to the housing.

5. The power assistance drive of claim 4 wherein the bearing carrier includes a bearing slide that is displaceably mounted in the housing.

6. The power assistance drive of claim 1 wherein the input pulley is mounted in the housing so as to be tiltable transversely to the input axis.

7. The power assistance drive of claim 1 comprising a positioning device that is connected to the housing for adjustably positioning and fixing the motor transversely to the output axis.

8. The power assistance drive of claim 1 wherein the input pulley is coaxially connected to a spindle nut in which a threaded spindle engages, with the threaded spindle being longitudinally displaceable in a direction of the output axis.

9. The power assistance drive of claim 8 wherein the threaded spindle is connected to a toothed rack in which a steering pinion engages, with the steering pinion being rotatably mounted in the housing and connected to a steering shaft.

10. A power assistance drive for a steering column of a motor vehicle, the power assistance drive comprising:
- a belt drive disposed in a housing, with an input pulley that is coupled to a motor shaft of a motor so as to be rotationally drivable about an input axis,
- wherein the input pulley is drivingly connected by a drive belt to an output pulley that is mounted in the housing so as to be rotatable about an output axis,
- wherein the motor is releasably attached to the housing and the motor shaft is connected to the input pulley by way of a releasable coupling,
- wherein the input pulley is mounted on a bearing carrier that is positionable relative to the housing, and
- wherein the bearing carrier includes a bearing slide that is displaceably mounted in the housing.

11. The power assistance drive of claim 10 comprising a positioning device that is connected to the housing for adjustably positioning and fixing the motor transversely to the output axis.

12. The power assistance drive of claim 10 wherein the input pulley is coaxially connected to a spindle nut in which a threaded spindle engages, with the threaded spindle being longitudinally displaceable in a direction of the output axis.

13. The power assistance drive of claim 12 wherein the threaded spindle is connected to a toothed rack in which a steering pinion engages, with the steering pinion being rotatably mounted in the housing and connected to a steering shaft.

14. A power assistance drive for a steering column of a motor vehicle, the power assistance drive comprising:
- a belt drive disposed in a housing, with an input pulley that is coupled to a motor shaft of a motor so as to be rotationally drivable about an input axis,
- wherein the input pulley is drivingly connected by a drive belt to an output pulley that is mounted in the housing so as to be rotatable about an output axis,
- wherein the motor is releasably attached to the housing and the motor shaft is connected to the input pulley by way of a releasable coupling, and
- wherein the power assistance drive comprises a positioning device that is connected to the housing for adjustably positioning and fixing the motor transversely to the output axis.

15. The power assistance drive of claim 14 wherein the input pulley is coaxially connected to a spindle nut in which a threaded spindle engages, with the threaded spindle being longitudinally displaceable in a direction of the output axis.

16. The power assistance drive of claim 15 wherein the threaded spindle is connected to a toothed rack in which a steering pinion engages, with the steering pinion being rotatably mounted in the housing and connected to a steering shaft.

17. A power assistance drive for a steering column of a motor vehicle, the power assistance drive comprising:
- a belt drive disposed in a housing, with an input pulley that is coupled to a motor shaft of a motor so as to be rotationally drivable about an input axis,
- wherein the input pulley is drivingly connected by a drive belt to an output pulley that is mounted in the housing so as to be rotatable about an output axis,
- wherein the motor is releasably attached to the housing and the motor shaft is connected to the input pulley by way of a releasable coupling, and
- wherein the input pulley is coaxially connected to a spindle nut in which a threaded spindle engages, with the threaded spindle being longitudinally displaceable in a direction of the output axis.

18. The power assistance drive of claim 17 wherein the threaded spindle is connected to a toothed rack in which a steering pinion engages, with the steering pinion being rotatably mounted in the housing and connected to a steering shaft.

\* \* \* \* \*